Feb. 29, 1972  R. G. H. RECORD ET AL  3,645,875
ELECTRODE ASSEMBLY
Filed Nov. 21, 1968
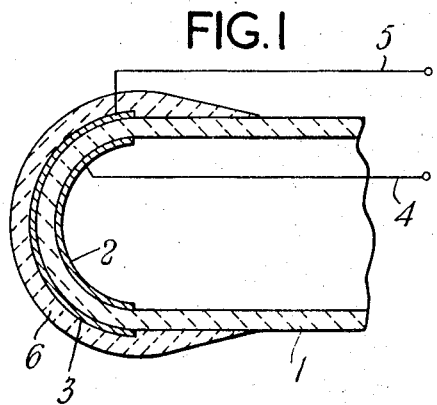
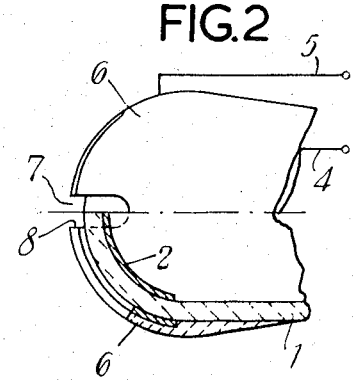
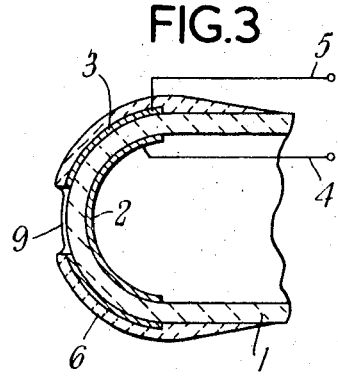
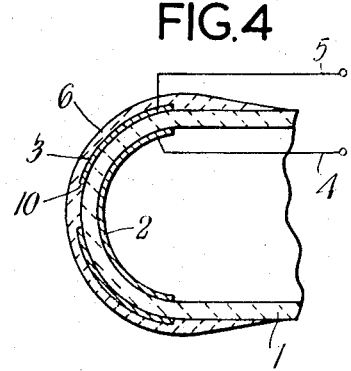
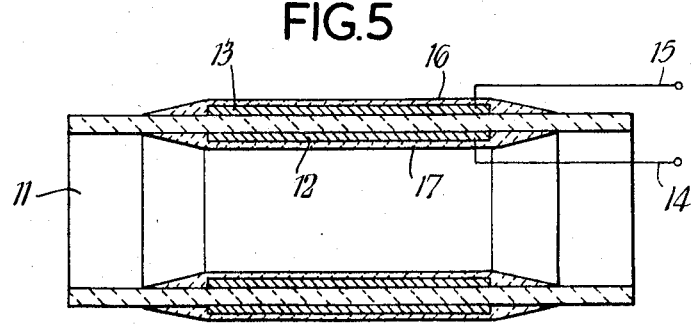
INVENTOR
ROBERT GEORGE HAMILTON RECORD
HAYDN WILSON
DEREK AUSTEN RUDD
BY Young + Thompson
ATTYS.

United States Patent Office 3,645,875
Patented Feb. 29, 1972

3,645,875
ELECTRODE ASSEMBLY
Robert George Hamilton Record, Haydn Wilson, and Derek Austen Rudd, Luton, England, assignors to George Kent Limited, Luton, England
Filed Nov. 21, 1968, Ser. No. 777,841
Claims priority, application Great Britain, Nov. 23, 1967, 53,424/67
Int. Cl. G01n 27/46
U.S. Cl. 204—195                           8 Claims

ABSTRACT OF THE DISCLOSURE

An electrode assembly, particularly for use at high temperatures, comprises a non-porous refractory base with metal electrode layers, of platinum for example, on opposed sides, at least one of which has a complete or discontinuous refractory overlayer for exposure to hot gases or liquids. The overlayer is porous where the electrode layer is completely encapsulated but need not be where portions, preferably edge portions, are exposed. The base may be constituted as a tube or as the closed end of a tube. The refractory material may be yttria stabilised thoria or lime stabilised zirconium oxide.

---

The invention relates to metal electrode assemblies, particularly for use at high temperatures.

For high temperature use, electrodes can be constituted as layers of platinum or other suitable metal on refractory material. It is desirable for some purposes to expose such electrodes directly to gases or liquids at extremely high temperatures, for example over 600° C. and up to 1300° C. or even more and they then have a rather short effective life, particularly where the gas or liquid concerned is corrosive.

It is therefore the object of the invention to provide an improved electrode assembly, particularly suited to use at high temperatures.

The invention accordingly provides an electrode assembly having an underlayer of refractory material, a metal layer constituting an electrode on a surface of the underlayer, and an overlayer of refractory material on at least a part of the electrode. The overlayer material must be porous where the overlayer is complete but need not be and preferably is not where the partial overlayer exposes part of the electrode. A pair of electrodes will normally be secured to the underlayer, and one or both may have the refractory overlayer applied to them. The invention thus also provides an electrode assembly having an underlayer of non-porous refractory material, a pair of metal layers, each constituting an electrode, on respective opposed surfaces of the underlayer, a pair of leads, each electrically connected to a respective one of the electrodes, and an overlayer of refractory material on at least part of one or each of the electrodes. To promote contact with surrounding gases, the electrode and/or the refractory overlayer may be discontinuous. The invention is of particular merit where electrodes are to be used in extreme conditions but is useful for securing electrodes on refractory material generally.

The invention may be more fully understood from the following description and from the accompanying drawing, which shows illustrative embodiments of the invention.

FIG. 1 is a sectional side view of a first electrode assembly embodying the invention;
FIG. 2 is a side view, partly sectional, of a modified assembly;
FIGS. 3 and 4 are sectional side views of further modifications of the assembly of FIG. 1; and
FIG. 5 is a sectional side view of a second form of electrode assembly embodying the invention.

Like parts are indicated by the same reference numerals in FIGS. 1–5.

The electrode assembly of FIG. 1 is in the form of an electrode probe for use at high temperatures in an in situ electrochemical oxygen meter, that is, a meter for measuring the oxygen content of a gas mixture. The probe comprises a hollow tube 1 of impervious refractory material, for example lime-stabilised zirconium oxide or thoria stabilised with yttria, with a closed end constituting an underlayer on which is deposited an inner electrode 2 and an outer electrode 3. Both electrodes are thin layers of platinum or other suitable metal or alloy. Leads 4 and 5 of suitable metallic wire connect with the inner and outer electrodes respectively for establishing electrical connection with appropriate measuring equipment which will be situated remotely from the probe.

In use, the closed end of the tube 1 extends into the gas mixture. A reference gas, which can be air in some circumstances, is provided within the tube. The assembly acts as an oxygen concentration cell, providing an electric potential between the electrodes 2 and 3 which is a function of the ratio of the oxygen partial pressures inside and outside the tube.

Such a meter can be used for example for the control of atmospheric composition during the annealing of metals, when control of the level of oxygen present is required to ensure that no oxidation takes place. Again, measurement directly of the amount of oxygen in flames during combustion processes enables much more precise control of such processes than conventional methods of measuring the flue gas contents.

Use in such applications, which involve for example, temperatures of 600–1300° C. or more, of the probe as so far described, would tend to cause the platinum to evaporate. Moveover, the bond between the platinum and the refractory would tend to be adversely affected by reducing conditions particularly at high temperatures. The presence of metal vapours, for example, in an annealing furnace, can cause alloying with the platinum and consequent embrittlement.

In accordance with the invention therefore a refractory overlayer 6 is applied by a suitable technique over the outer electrode 3 as shown so that the electrode is encapsulated. It is of course essential for the gas being analysed to be in contact both with the outer electrode 3 and the outer surface of the probe tube 1 and the layer 6 is therefore necessarily porous. The rate of response of the instrument to a change in the oxygen concentration in the gas will thus depend on the porosity of the electrode layer and the layer 6. Above 600–700° C., the presence of the layer 6 is offset by the greater diffusion rate of the gas molecules through the two layers but where fast response is essential the assembly of FIG. 1 can be modified as described below.

The overlayer 6 can be attached by firing on to the tip of the tube, at a temperature of 1750° C. or more, a paste of finely powdered refractory material, for example, zirconium oxide, and a binder, such as glycerine, which burns away during the firing operation. Alternatively the layer can be attached by flame spraying, when, in general, a more adherent and less porous layer is obtained. The metal electrode 3 can be attached either by firing on a paste or by flame spraying. The electrode lead 5 is embedded in the electrode either by immersion in a blob of the paste prior to firing, or by placing it in a position on the tip of the tube before applying the flame sprayed coating of metal.

The modified assembly shown in FIG. 2 provides a faster response rate than that of FIG. 1, which it resembles except in that a generally cross-shaped portion 7 of the electrode 3 and the layer 6 is omitted, so that the edges of the overlayer 6 and electrode are exposed to the gas being measured at 8. The modified assembly can readily be produced either by masking the tip of the probe tube 1 whilst the electrode and the outer refractory layer are being applied or by grinding away the unwanted parts after coating the entire area.

The second modification of the first-described assembly, shown in FIG. 3, differs from it in that a circular hole 9 is made in the outer refractory layer 6 and in the electrode 3. More than one such hole 9 can be provided. This assembly can be made in ways similar to those described in connection with FIG. 2. As parts of the electrode are exposed in the arrangements of FIGS. 2 and 3, the material of the refractory outer layer need not be and preferably is not porous.

The embodiment of FIG. 4 differs from that of FIG. 1 only in that the electrode 3 is centrally apertured, at 10 the outer porous layer 6 being unbroken. As the gas must diffuse through this unbroken refractory layer, which is of course porous, the assembly of FIG. 4 offers less of an improvement over that of FIG. 1 in response rate than do the assemblies of FIGS. 2 and 3, but the outer electrode 3 is completely protected.

It will be clear from the embodiments of the invention so far described that the shapes of the outer electrode and the outer refractory layer or overlayer need not correspond, though it is preferable not to expose any substantial area of the former. The outer layer and electrode can be shaped in a variety of ways other than those described but the electrode is preferably not actually divided, to avoid the necessity to provide more than one lead for connection to it.

The electrode assembly shown in FIG. 5, again forming part of an electrochemical oxygen meter, has electrodes 12 and 13 secured respectively inside and outside a refractory tube 11 constituting an underlayer for the electrodes. The tube is mounted in its own small furnace as part of a laboratory gas testing apparatus. A sample of a gas to be tested and a reference gas are made to flow respectively inside and outside the tube 11 or vice versa. The temperatures experienced by the electrodes 12 and 13 are here less extreme and the gas sample can be filtered to remove harmful metal vapours and the like before it reaches the electrode. Even so, the life of such apparatus is limited by the conditions to which it is exposed and in accordance with the invention, the electrodes are encapsulated by respective refractory overlayers 16 and 17 through which leads 14 and 15 extend for connection of the electrodes to the electric measuring equipment of the meter.

One only of the electrodes of the assembly of FIG. 5 need be encapsulated and the or each electrode need not be complete and the electrode area need not be continuous. The electrodes 12 and 13 and the overlayers 16 and 17 can be formed in the same way as those of the embodiment previously described and apertures in either or both can be produced by methods similar to those described in connection with FIGS. 2–4 if a higher response rate is required.

We claim:
1. An electrode assembly incorporating an electrode for exposure to high temperature fluid, the assembly comprising an underlayer formed of nonporous refractory material which is a solid metallic oxide that conducts electricity predominantly by the transfer or migration of oxygen ions therethrough, a metal film on a surface of the underlayer, said film constituting the electrode, and a thin protective layer of solid refractory material overlaying said electrode film but exposing at least a portion thereof.

2. An electrode assembly as claimed in claim 1 in which the refractory material of the overlayer is porous.

3. An electrode assembly as claimed in claim 1 in which the refractory material of the overlayer is nonporous.

4. An electrode assembly as claimed in claim 1 in which the electrode film and the overlayer are apertured.

5. An electrode assembly as claimed in claim 1 in which said underlayer has a second surface extending generally parallel to the said surface thereof, said assembly having a second metal film on said second surface, the second metal film constituting a second electrode and a second metal lead electrically connected to said second electrode film.

6. An electrode assembly as claimed in claim 5 in which said first-mentioned and said second surfaces of the underlayer comprise the outer and inner surfaces respectively of a closed end of a tube.

7. An electrode assembly as claimed in claim 5 in which said first-mentioned and said second surfaces of the underlayer comprise the outer and inner surfaces respectively of a tube.

8. An electrode assembly as claimed in claim 5 having a thin protective layer of solid porous refractory material overlaying the electrode film on said second surface.

References Cited

UNITED STATES PATENTS

| | | | |
|---|---|---|---|
| 3,400,054 | 9/1968 | Ruka et al. | 204—1.1 |
| 3,442,773 | 5/1969 | Wilson | 204—1.1 |
| 3,464,008 | 8/1969 | Meysson et al. | 204—195 |
| 3,468,780 | 9/1969 | Fischer | 204—195 |
| 3,481,855 | 12/1969 | Kolodney et al. | 204—1.1 |

OTHER REFERENCES

Weissbart et al.: "The Review of Scientific Instruments," vol. 32, No. 5, 1961, pp. 593–595.

Horsley: "AERE Report R 3427," 1961, pp. 1 and 11–14.

TA-HSUNG TUNG, Primary Examiner